(12) United States Patent
Bish et al.

(10) Patent No.: US 8,846,812 B2
(45) Date of Patent: *Sep. 30, 2014

(54) PROCESS FOR MANUFACTURING FLUOROELASTOMER COMPOSITIONS CONTAINING FLUOROPLASTIC FIBRILS

(71) Applicant: E I du Pont de Nemours and Company, Wilmington, DE (US)

(72) Inventors: Christopher J Bish, Kennett Square, PA (US); Kostantinos Kourtakis, Media, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,609

(22) Filed: Nov. 14, 2012

(65) Prior Publication Data

US 2013/0158202 A1 Jun. 20, 2013

Related U.S. Application Data

(60) Provisional application No. 61/570,882, filed on Dec. 15, 2011.

(51) Int. Cl.
| | | |
|---|---|---|
| *C08J 3/00* | (2006.01) | |
| *C08L 27/12* | (2006.01) | |
| *C08F 214/26* | (2006.01) | |
| *C08J 3/205* | (2006.01) | |
| *C08L 33/22* | (2006.01) | |
| *C08K 7/02* | (2006.01) | |

(52) U.S. Cl.
CPC .................. *C08L 33/22* (2013.01); *C08J 3/205* (2013.01); *C08J 2327/18* (2013.01); *C08L 27/12* (2013.01); *C08K 7/02* (2013.01); *C08J 3/005* (2013.01)
USPC ............ 525/197; 525/198; 525/199; 525/200

(58) Field of Classification Search
USPC .................................. 525/197, 198, 199, 200
See application file for complete search history.

(56) References Cited

U.S. PATENT DOCUMENTS

| | | | |
|---|---|---|---|
| 4,214,060 | A | 7/1980 | Apotheker et al. |
| 4,281,092 | A | 7/1981 | Breazeale |
| 4,387,168 | A * | 6/1983 | Morita ........................... 521/54 |
| 4,520,170 | A | 5/1985 | Kitto et al. |
| 5,418,270 | A | 5/1995 | Peters |
| 5,789,489 | A | 8/1998 | Coughlin et al. |
| 6,512,063 | B2 | 1/2003 | Tang |
| 6,924,344 | B2 | 8/2005 | Bauerle et al. |
| 2001/0034414 | A1 | 10/2001 | Effenberger et al. |
| 2006/0155011 | A1 | 7/2006 | Frances et al. |
| 2011/0269909 | A1 | 11/2011 | Bish |

FOREIGN PATENT DOCUMENTS

| | | | |
|---|---|---|---|
| EP | 106180 | A2 | 7/1987 |
| GB | 2084590 | A | 4/1982 |

OTHER PUBLICATIONS

Database WPI Week 197810 Thomson Scientific London, GB; AN 1978-18607A XP002696371, & JPS538650A (Ashahi Glass Co Ltd) Jan. 26, 1978 Abstract.
Database WPI Week 197819 Thomson Scientific, London, GB: AN 1978-34389A XP002696372 & JPS5334848A (Ashahi Glass Co Ltd) Mar. 31, 1978 Abstract.

* cited by examiner

Primary Examiner — Nathan M Nutter

(57) ABSTRACT

Disclosed herein is a process for the manufacture of a fluoroelastomer composition containing fluoropolymer fibrils. The process comprises applying shear to a fluoroelastomer gum in a mixer while adding a liquid dispersion of fibrillatable fluoropolymer.

4 Claims, No Drawings

PROCESS FOR MANUFACTURING FLUOROELASTOMER COMPOSITIONS CONTAINING FLUOROPLASTIC FIBRILS

CROSS-REFERENCE TO RELATED APPLICATIONS

This application claims the benefit of U.S. Provisional Application No. 61/570,882 filed Dec. 15, 2011.

FIELD OF THE INVENTION

This invention pertains to a process for the manufacture of fluoroelastomer compositions filled with fluoroplastic fibrils.

BACKGROUND OF THE INVENTION

Fluoroelastomers are well known in the art; see for example U.S. Pat. Nos. 4,214,060; 4,281,092; 5,789,489; 6,512,063 and 6,924,344 B2. They may be partially fluorinated (i.e. contain copolymerized units of at least one monomer having C—H bonds such as vinylidene fluoride, ethylene or propylene) or be perfluorinated (i.e. contain copolymerized units of monomers not having C—H bonds). Examples of fluoroelastomers include, but are not limited to copolymers of i) vinylidene fluoride, hexafluoropropylene and, optionally, tetrafluoroethylene; ii) vinylidene fluoride, perfluoro(methyl vinyl ether) and, optionally, tetrafluoroethylene; iii) tetrafluoroethylene and propylene; and iv) tetrafluoroethylene and perfluoro(methyl vinyl ether). Optionally, the fluoroelastomer may further comprise copolymerized units of a cure site monomer to assist in the crosslinking of the elastomer.

Shaped fluoroelastomer articles (e.g. seals, gaskets, tubing, etc.) are typically made by first compounding the fluoroelastomer with other ingredients such as filler, curative, process aids, colorants, etc., shaping the compound (e.g. by extrusion though a die or by molding) and then curing the shaped article.

Non-fibrillating fluoroplastic particles are often employed as fillers in fluoroelastomers. However, high loading of non-fibrillating fluoroplastics is required in order to achieve a modulus or hardness suitable for some end uses. High loading can cause the compression set resistance to undesirably increase.

Fibrillatable fluoroplastic fillers for fluoroelastomers have been disclosed previously, e.g. U.S. Pat. No. 4,520,170. However, the compositions are made by a cumbersome cryogenic pulverization process. It would be desirable to have a more commercially feasible process for introducing fibrillating fluoroplastic filler into a fluoroelastomer composition.

SUMMARY OF THE INVENTION

One aspect of the present invention is a process comprising:
A) applying shear to a fluoroelastomer gum in a mixer;
B) adding a liquid dispersion of fibrillatable fluoroplastic particles to said fluoroelastomer gum while applying shear in said mixer, thereby forming a fluoroelastomer composition containing fluoroplastic fibrils dispersed therein.

DETAILED DESCRIPTION OF THE INVENTION

The present invention is directed to a process for manufacturing a fluoroelastomer composition that contains fluoroplastic fibrils.

The fluoroelastomer that may be employed in the process of the invention may be partially fluorinated or perfluorinated. Fluoroelastomers preferably contain between 25 and 70 weight percent, based on the total weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluoromonomers, hydrocarbon olefins and mixtures thereof. Fluoromonomers include fluorine-containing olefins and fluorine-containing vinyl ethers.

Fluorine-containing olefins which may be employed to make fluoroelastomers include, but are not limited to vinylidene fluoride ($VF_2$), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE) and vinyl fluoride.

Fluorine-containing vinyl ethers that may be employed to make fluoroelastomers include, but are not limited to perfluoro(alkyl vinyl)ethers. Perfluoro(alkyl vinyl)ethers (PAVE) suitable for use as monomers include those of the formula $$CF_2=CFO(R_f O)_n(R_{f'} O)_m R_f \quad (I)$$

where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl)ethers includes compositions of the formula $$CF_2=CFO(CF_2CFXO)_n R_f \quad (II)$$

where X is F or $CF_3$, n is 0-5, and $R_f$ is a perfluoroalkyl group of 1-6 carbon atoms.

A most preferred class of perfluoro(alkyl vinyl)ethers includes those ethers wherein n is 0 or 1 and $R_f$ contains 1-3 carbon atoms. Examples of such perfluorinated ethers include perfluoro(methyl vinyl ether) (PMVE), perfluoro(ethyl vinyl ether) (PEVE) and perfluoro(propyl vinyl ether) (PPVE). Other useful monomers include those of the formula $$CF_2=CFO[(CF_2)_m CF_2 CFZO]_n R_f \quad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl)ether monomers include compounds of the formula $$CF_2=CFO[(CF_2CF\{CF_3\}O)_n(CF_2CF_2CF_2O)_m (CF_2)_p]C_x F_{2x+1} \quad (IV)$$

where m and n independently=0-10, p=0-3, and x=1-5. Preferred members of this class include compounds where n=0-1, m=0-1, and x=1.

Other examples of useful perfluoro(alkyl vinyl ethers) include $$CF_2=CFOCF_2CF(CF_3)O(CF_2O)_m C_n F_{2n+1} \quad (V)$$

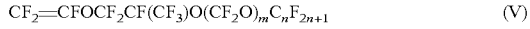

where n=1-5, m=1-3, and where, preferably, n=1.

If copolymerized units of PAVE are present in fluoroelastomers employed in the process of the invention, the PAVE content generally ranges from 25 to 75 weight percent, based on the total weight of the fluoroelastomer. If perfluoro(methyl vinyl ether) is used, then the fluoroelastomer preferably contains between 30 and 65 wt. % copolymerized PMVE units.

Hydrocarbon olefins useful in the fluoroelastomers employed in the invention include, but are not limited to ethylene and propylene. If copolymerized units of a hydrocarbon olefin are present in the fluoroelastomers, hydrocarbon olefin content is generally 4 to 30 weight percent.

The fluoroelastomers employed in the process of the present invention may also, optionally, comprise units of one or more cure site monomers. Examples of suitable cure site monomers include, but are not limited to: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3, 3,3-pentafluoropropene (2-HPFP); viii) perfluoro(2-phenoxypropyl vinyl)ether; and ix) non-conjugated dienes.

Units of cure site monomer, when present in the fluoroelastomers employed in this invention, are typically present at a level of 0.05-10 wt. % (based on the total weight of fluoroelastomer), preferably 0.05-5 wt. % and most preferably between 0.05 and 3 wt. %.

Alternatively, or in addition to units of a cure site monomer, fluoroelastomers employed in this invention may contain cure sites (e.g. Br or I) at chain ends.

Fluoroplastics that may be employed in this invention are semi-crystalline fluoropolymers and include, but are not limited to polytetrafluoroethylene (PTFE), modified PTFE (e.g. acrylic modified PTFE) and copolymers of tetrafluoroethylene (e.g. tetrafluoroethylene/perfluoro(propyl vinyl ether)). PTFE is preferred. Fibrillatable fluoroplastic refers to fluoroplastic that forms nanosized in at least one dimension (i.e. <100 nm width) fibrils which can vary in length from submicron to several microns in length when exposed to shear during mixing with the fluoroelastomer. The amount of fluoroplastic (dry weight) added to the fluoroelastomer composition is generally between 0.01 and 20 (preferably between 0.5 and 15) parts by weight per hundred parts by weight fluoroelastomer.

The fluoroplastic is in the form of a liquid dispersion when added to the fluoroelastomer composition. The dispersion contains fluoroplastic particles having a d90 (d90 is defined as 90 volume % have diameters of this value or less) of less than 5 microns, preferably less than 1 micron, most preferably a d90 less than 0.5 microns and a d50 (d50 is defined as 50 volume % have diameters of this value or less) less than 0.3 microns. The fluoroplastic particles are distributed within a polar or non-polar liquid. The concentration of the fluoroplastic particles may vary from 0.1 wt % to 70 wt %, based on total weight of dispersion. Preferably, the fluoroplastic particles are dispersed in a polar liquid within a concentration range of 10 to 70 wt %, most preferably 50 to 70 wt %. Preferably, the dispersion is an aqueous dispersion that may optionally contain one or more surfactants.

In the process of this invention, shear is first applied to a fluoroelastomer gum in a mixer. The fluoroelastomer gum is not in the form of a latex. Instead, it is substantially dry (i.e. contains less than 1 wt. % water, preferably less than 5000 ppm water). Any mixer typically employed in the rubber industry may be used. A 2-roll rubber mill is preferred. Optionally, other ingredients commonly employed in the rubber industry (e.g. curative packages, process aids, colorants, etc.) may be incorporated into the fluoroelastomer gum, either before or after addition of the fluoroplastic dispersion.

The liquid dispersion of fibrillatable fluoroplastic is added slowly to the mixer containing the fluoroelastomer gum that is under shear. The shear applied during mixing fibrillates the fluoroplastic. Mixing is continued until the fluoroplastic fibrils are well dispersed in the fluoroelastomer gum. The liquid (e.g. water) in the fluoroplastic dispersion evaporates from the composition during mixing. If necessary, the mixing temperature may be adjusted in order to volatilize the liquid.

The resulting fluoroelastomer compositions contain well dispersed fibrils of fluoroplastic. Fibrils have a width less than 100 nm and vary in length from submicron to micron. Aggregates of unfibrillated fluoroplastic structures are reduced by the process of the invention, compared with conventional processing methods such as dry blending, so that there are no unfibrillated aggregates having a diameter greater than 500 nm present in the compositions. These aggregates and non-fibrillar structures are typically observed when unfibrillated fluoroplastic powders having d90 of 5 microns or greater are employed. Other processes for making fluoroelastomer compositions containing fibrillatable fluoroplastic typically result in regions of fluoroplastic fibrils and regions of large (>500 nm) fluoroplastic aggregates within the fluoroelastomer composition.

The fluoroelastomer compositions made by the process of this invention form cured articles that are useful in many industrial applications including seals, wire coatings, tubing and laminates. The cured articles exhibit improved tear strength vs. similar articles absent the fluoroplastic fibrils.

Cured articles of the invention have a tear resistance (measured at 200° C. according to ASTM 1938-08) of at least 0.15 (preferably at least 0.2) N/mm and a modulus at 50% elongation (measured at 25° C. according to ASTM D 412) of at least 0.9 (preferably at least 1.15, most preferably at least 1.55) MPa.

EXAMPLES

Test Methods $M_{50}$, modulus at 50% elongation (MPa) was measured according to ASTM D 412 at 25° C.
Tear resistance (force required to propagate a tear divided by sample thickness, N/mm) was performed at 200° C. according to ASTM D1938-08.
Particle Size Measurement: Volume-weighted particle size distributions were measured on a Malvern Instruments Ltd. Zetasizer nano-S, which uses the Dynamic Light Scattering (DLS) technique that is described in ISO 22412:2008. The vendor's software (version 4.10) was set to record 36 runs of 10 seconds each, with an equilibration time of 4 minutes at a temperature of 25° C. The "general purpose" (i.e. multimodal) data inversion routine was selected. Samples were diluted with filtered, deionized water to 0.1% by volume before measurement.
Transmission Electron Microscope (TEM) Imaging of O-ring Samples was performed by the following procedure.

To prepare ultrathin specimens, a diamond knife was used to cut sections by low temperature ultramicrotomy. The knife boat employed to accumulate sections was filled with absolute ethanol to prevent freezing at the operating temperature of −90° C. A specimen block was trimmed with single edge razor blades. The block was secured in the flat jaws of the cryoultramicrotome sample holder and sectioned to nominal thickness 90 nm. After sectioning was complete, the boat fluid with sections was poured into a shallow dish of water. The sections floating on the water/alcohol mixture were retrieved on copper mesh grids, and blotted on filter paper.

Unstained sections were examined in a Transmission Electron Microscope (TEM) operated at 200 KV accelerating voltage. Images of magnification 1000-20,000× were recorded on a digital camera.

The fluoroelastomer gum employed in the examples was a copolymer of tetrafluoroethylene, perfluoro(methyl vinyl ether) and perfluoro(8-cyano-5-methyl-3,6-dioxa-1-octene) and was prepared according to the general process described in U.S. Pat. No. 5,789,489.

Diphenylguanidine (phthalic acid salt) was employed as the curative.

Example 1

The fluoroplastic dispersion employed in this example was a 60 wt % aqueous dispersion of fine (d50=200-220 nm, d90=300-320 nm) fibrillatable PTFE particles having a standard specific gravity (SSG) of 2.218-2.222 as measured according to ASTM D4895.

Fluoroelastomer gum (427.92 g) was blended or banded on a 2-roll mill along with curative (4.96 g). To this composition was added 28.53 g of fluoroplastic dispersion by slowly dripping the fluoroplastic dispersion onto the fluoroelastomer composition while blending on the mill. The mill was maintained at about 80° C. and the water present in the fluoroplastic dispersion evaporated during mixing. This resulted in a fluoroelastomer composition that contained 4 parts by weight PTFE per hundred parts by weight fluoroelastomer (dry weights).

The resulting fluoroelastomer composition containing fluoroplastic fibrils was molded into o-rings or slabs and cured at 190° C. for 11 minutes. The articles were than post cured under nitrogen at 305° C. for 26 hours, after a slow ramp up in temperature from room temperature.

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

Example 2

A procedure similar to that described in Example 1 was employed except that 419.93 g of fluoroelastomer was combined with 4.87 g of curative on a 2-roll mill and 41.99 g of the PTFE dispersion was added by slow dripping. This resulted in a fluoroelastomer composition that contained 6 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

No unfibrillated fluoroplastic aggregates having a diameter greater than 500 nm were observed in the TEM images. Fluoroplastic fibrils had a width less than 100 nm.

Example 3

A procedure similar to that described in Example 1 was employed except that 412.24 g of fluoroelastomer was combined with 4.78 g of curative on a 2-roll mill and 54.97 g of the PTFE dispersion was added by slow dripping. This resulted in a fluoroelastomer composition that contained 8 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

Example 4

A procedure similar to that described in Example 1 was employed except that 404.82 g of fluoroelastomer was combined with 4.70 g of curative on a 2-roll mill and 67.47 g of the PTFE dispersion was added by slow dripping. This resulted in a fluoroelastomer composition that contained 10 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

Example 5

The fluoroplastic dispersion employed in this example was a 60 wt % aqueous dispersion of fine (d50=240-250 nm, d90<500 nm) fibrillatable PTFE particles having an SSG of 2.218-2.222.

A procedure which was similar to that described in Example 1 was used, except that the above fluoroplastic dispersion was employed. This resulted in a fluoroelastomer composition that contained 4 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

Example 6

The fluoroplastic dispersion employed in this example was a 60 wt % aqueous dispersion of fine (d50=240-250 nm, d90<500 nm) fibrillatable PTFE particles having an SSG of 2.218-2.222.

A procedure which was similar to that described in Example 2 was used, except that the above fluoroplastic dispersion was employed. This resulted in a fluoroelastomer composition that contained 6 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

No unfibrillated fluoroplastic aggregates having a diameter greater than 500 nm were observed in the TEM images. Fluoroplastic fibrils had a width less than 100 nm.

Example 7

The fluoroplastic dispersion employed in this example was a 60 wt % aqueous dispersion of fine (d50=240-250 nm, d90<500 nm) fibrillatable PTFE particles having an SSG of 2.218-2.222.

A procedure which was similar to that described in Example 3 was used, except that the above fluoroplastic dispersion was employed. This resulted in a fluoroelastomer composition that contained 8 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

Example 8

The fluoroplastic dispersion employed in this example was a 60 wt % aqueous dispersion of fine (d50=240-250 nm, d90<500 nm) fibrillatable PTFE particles having an SSG of 2.218-2.222.

A procedure which was similar to that described in Example 4 was used, except that the above fluoroplastic dispersion was employed. This resulted in a fluoroelastomer composition that contained 10 parts by weight PTFE per hundred parts by weight fluoroelastomer (dry weights).

Modulus at 50% elongation ($M_{50}$) at 25° C. was measured on o-rings. Tear resistance was measured at 200° C. using ASTM 1938-08 for tear propagation resistance of a film measuring 2.3-2.6 mm in thickness which is cut with the appropriate die ("trouser tear"). Results are shown in the Table.

Comparative Example A

In this example, carbon black was used in place of a fluoroplastic dispersion. Fluoroelastomer (343.09 g) was blended or banded on a 2-roll mill along with 102.93 g N990 MT carbon (Cancarb Ltd.) and 3.98 g curative.

The resulting fluoroelastomer composition containing 30 parts by weight per hundred parts by weight fluoroelastomer of carbon black instead of fluoroplastic fibrils was molded into o-rings or slabs and cured at 190° C. for 11 minutes. The articles were than post cured under nitrogen at 305° C. for 26 hours after a slow ramp up from room temperature.

Modulus at 50% elongation ($M_{50}$) at 25 C was measured on o-rings and tear resistance was measured at 200° C. using ASTM 1938-08 for tear propagation resistance of a film measuring 2.3-2.6 mm in thickness which is cut with the appropriate die ("trouser tear") Results are shown in the Table.

TABLE

|  | Ex. 1 | Ex. 2 | Ex. 3 | Ex. 4 | Ex. 5 | Ex. 6 | Ex. 7 | Ex. 8 | Comp. Ex. A |
|---|---|---|---|---|---|---|---|---|---|
| $M_{50}$, MPa, at 25° C. | 0.95 | 1.25 | 1.65 | 2.11 | 0.99 | 1.16 | 1.55 | 2.25 | 1.58 |
| Tear resistance, 200° C., N/mm | 0.16 | 0.39 | 0.39 | 0.55 | 0.03 | 0.21 | 0.22 | 0.74 | 0.06 |

What is claimed is:

1. A cured fluoroelastomer article comprising:
   A) a fluoroelastomer; and
   B) 0.01 to 20 parts by weight, per hundred parts by weight of fluoroelastomer, of fluoroplastic fibrils having a diameter less than 100 nm, wherein said composition is free from fluoroplastic aggregates having a diameter greater than 500 nm.

2. The cured fluoroelastomer article of claim 1 having a tear resistance measured at 200° C. according to ASTM 1938-08 of at least 0.15 N/mm and a modulus at 50% elongation measured at 25° C. according to ASTM D 412 of at least 0.9 MPa.

3. The cured fluoroelastomer article of claim 2 having a tear resistance measured at 200° C. according to ASTM 1938-08 of at least 0.15 N/mm and a modulus at 50% elongation measured at 25° C. according to ASTM D 412 of at least 1.15 MPa.

4. The cured fluoroelastomer article of claim 3 having a tear resistance measured at 200° C. according to ASTM 1938-08 of at least 0.2 N/mm and a modulus at 50% elongation measured at 25° C. according to ASTM D 412 of at least 1.55 MPa.

* * * * *